United States Patent [19]

Petrunia

[11] Patent Number: 5,212,761
[45] Date of Patent: May 18, 1993

[54] FIBER OPTIC MODULE

[75] Inventor: Alexander Petrunia, Allentown, Pa.

[73] Assignee: AT&T Bell Laboratories, Murray Hill, N.J.

[21] Appl. No.: 874,314

[22] Filed: Apr. 27, 1992

[51] Int. Cl.⁵ .................. G02B 6/00; G02B 6/36
[52] U.S. Cl. ................................................ 385/135
[58] Field of Search ................................. 385/76, 135

[56] References Cited

U.S. PATENT DOCUMENTS

| | | | |
|---|---|---|---|
| 4,792,203 | 12/1988 | Nelson et al. | 385/135 |
| 4,932,744 | 6/1990 | Messelhi | 385/135 X |
| 5,071,211 | 12/1991 | Debortoli et al. | 385/76 |
| 5,115,489 | 5/1992 | Norris | 385/135 |

*Primary Examiner*—Akm E. Ullah
*Attorney, Agent, or Firm*—Lester H. Birnbaum

[57] ABSTRACT

Disclosed is a module for connecting optical fibers in a lightwave cross-connect distribution system. The module includes a curved channel for receiving an optical fiber cable. The channel is open along a major surface of the module housing to permit the cable to flex out of the channel while the module is inserted or removed from a distribution shelf.

7 Claims, 4 Drawing Sheets

FIBER OPTIC MODULE

BACKGROUND OF THE INVENTION

This invention relates to optical fiber modules for installation in a distribution frame.

Optical fiber cross-connect distribution frames serve the function of coupling incoming fiber optic cables to customer equipment. Each shelf of the frame includes a plurality of modules, each module comprising a set of optical fiber connectors on a front panel, and means for receiving the fibers from the incoming cable for connection to the connectors on the front panel. These modules should be capable of retrofitting into existing cross-connect frames, such as AT&T's LGX ® Distribution System, and also must be easily removed and reinstalled for the purposes of maintenance and repair. Consequently, sufficient cable slack should be provided in the shelf when the module is installed so that a craftsperson can work on the module at some distance away from the shelf when it is removed.

Optical fiber cable coming into a standard cross-connect frame usually has internal reinforcement members and a fairly thick protective sheath (i.e., of the order of 0.15 to 0.36 inches in diameter) in order to protect the fiber ribbons in the cable. The cable, therefore, tends to be fairly stiff. Further, the cable usually requires a bend radius of at least 3 inches to ensure that the fibers are not damaged. It is, therefore, difficult to bend the cable in such a way as to provide the necessary slack in the area provided in the shelf while maintaining the minimum bend radius.

The usual approach to this problem is to cut the cable sheathing and reinforcement member so that only the fiber ribbons enter the module. Sometimes, an intermediate tubing can be provided around the fibers which enter the module (see, e.g., U.S. Pat. No. 5,071,211 issued to Debortoli, et al.).

While these approaches may be adequate, they do not provide the full protection of the fibers afforded by the cable sheathing and reinforcement member.

Consequently, it is an object of the invention to provide a module which permits direct entry of an optical fiber cable, including its sheathing, while providing the needed cable slack when the module is installed in a distribution shelf.

SUMMARY OF THE INVENTION

These and other objects are achieved in accordance with the invention, which is a device comprising a housing including an interior and a curved outer surface. A channel is formed within a portion of the curved surface. The channel is open along the curved surface, and includes a port communicating with the interior of the housing. An optical fiber cable is secured to the housing so that the cable enters the interior at said port, and a portion of the cable may be positioned within the channel. An array of optical fiber connectors is mounted at another surface of the housing.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION

Figure 1:
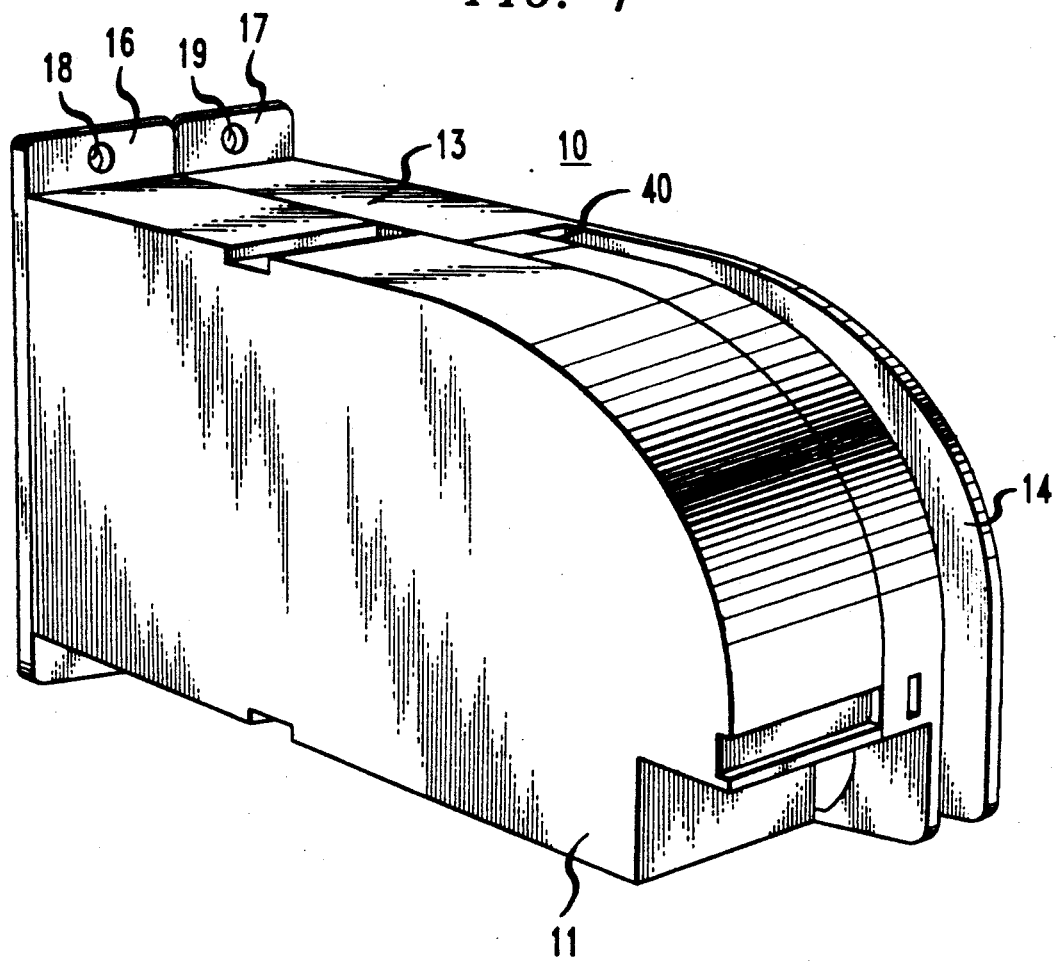
FIG. 1 is a perspective view of the housing of the module in accordance with an embodiment of the invention.
Figure 2:
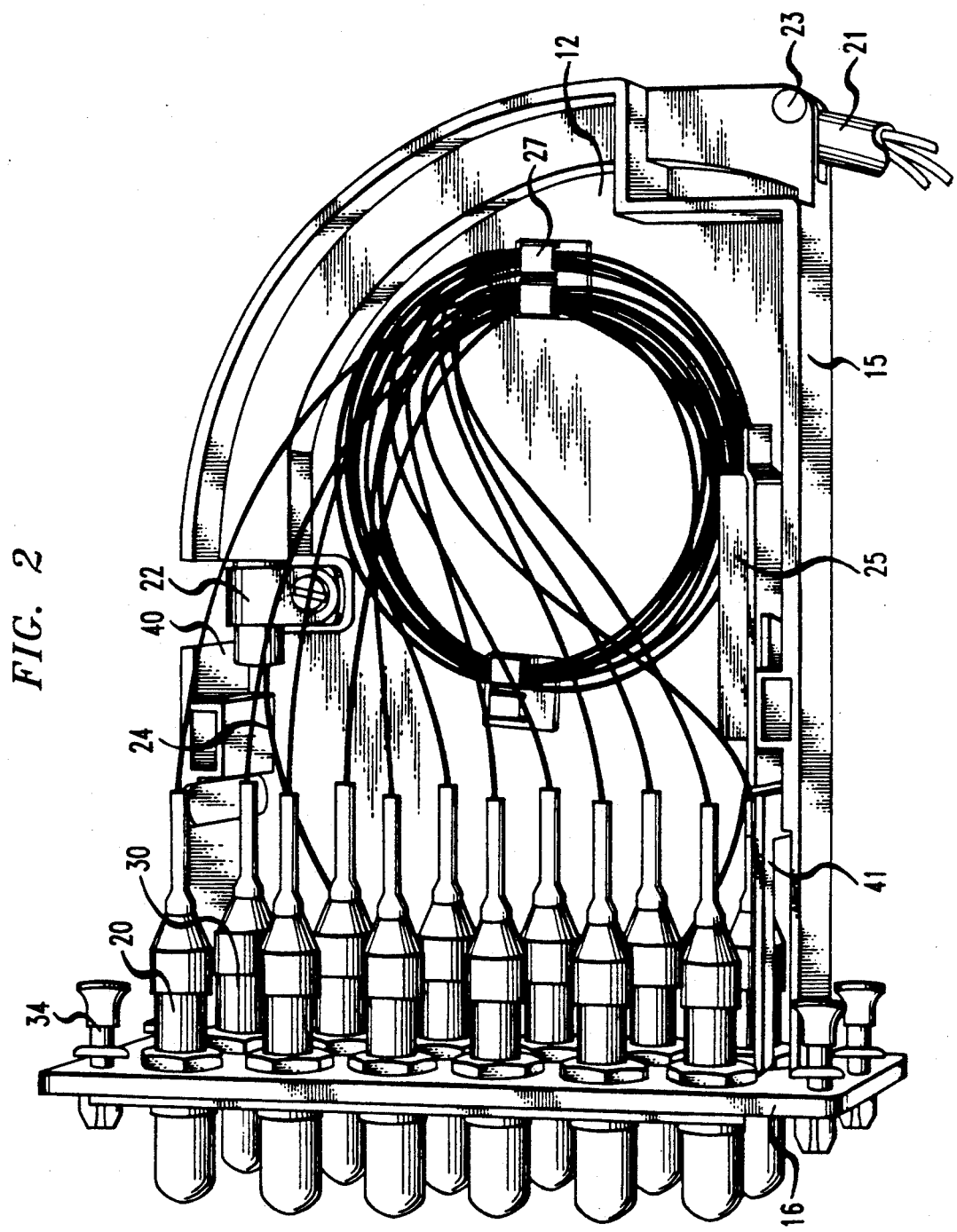
FIG. 2 is a side view of the module including optical fibers and connectors in accordance with the same embodiment.
Figure 3:
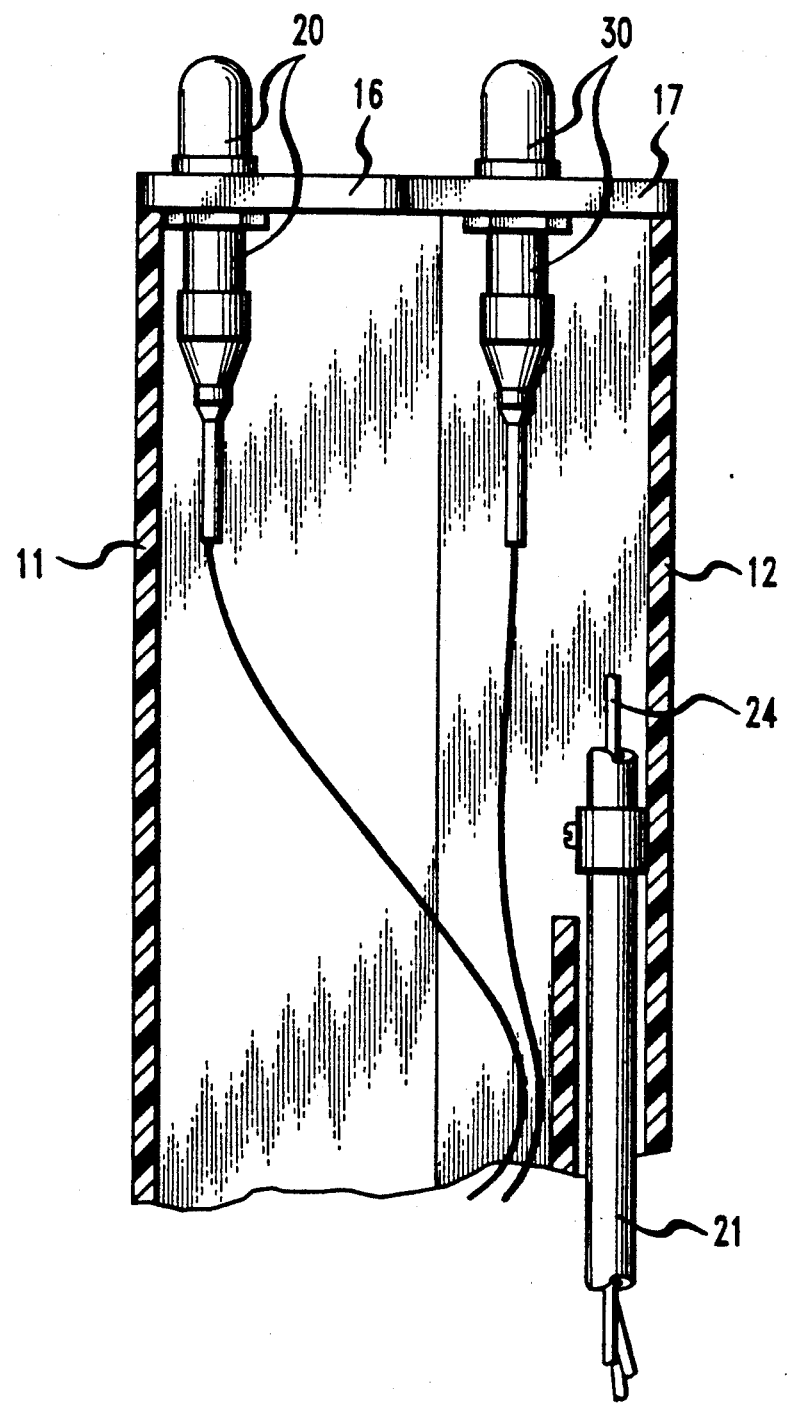
FIG. 3 is a top cross-sectional view of the module in accordance with the same embodiment.

FIG. 1 illustrates the housing for the module 10, while FIGS. 2 and 3 show additional details in accordance with one embodiment. The housing includes two vertical side surfaces, 11 and 12, and a top surface 13 which spans the distance between the two sides. At least a portion of the top surface 13 is curved so that the surface exhibits a radius of curvature which is typically at least 3 inches. A portion of the curved surface includes an open channel 14 formed therein extending from a horizontal portion of the surface 13 to a bottom surface of the housing (15 of FIG. 2). A port, 40, is formed at one end of the channel so that the channel communicates with the interior of the housing. Attached to the front of the housing 10, typically by means of bracket, 41, which is screwed to the housing and to the panels, is a pair of panels, 16 and 17, which are capable of holding an array of optical fiber connectors (e.g., 20 and 30 of FIGS. 2 and 3). Panels 16 and 17 could be replaced by a single panel holding the same number of connectors. Each panel, 16 and 17, includes an aperture (e.g., 18 and 19) at the top and bottom to permit mounting of the module to the bulkhead of a standard distribution shelf (not shown) by means of push-type snap fasteners, e.g., 34 and 35, which are provided in the apertures as shown in FIG. 2. Other conventional fasteners could be used.

Typically, the module housing will measure approximately 2.30 inches between the two side surfaces, 11 and 12, and approximately 6.2 inches from the panels 16 and 17 to the other end of the bottom surface. While the module shown is designed to accommodate 12 connectors, the portion including the side surface 11 can be removed and replaced with a flat member to produce a module including only 6 connectors (mounted in panel 17). In that case, the module would typically be approximately 1.2 inches wide. Of course, any number of connectors can be employed in accordance with the invention. Panels 16 and 17 could also be molded as part of sides 11 and 12, respectively.

FIG. 2 illustrates the module of FIG. 1 with side surface 11 removed and the addition of certain components. As shown, the incoming cable 21 is mounted to the module by means of a cable clamp 22 which is screwed into the side 12 of the module so that the cable extends through the port 40 at the interior of the module. The clamp, therefore, provides strain relief for the cable which, along with its outer sheathing, is secured to the module while lying within the channel 14. A removable member such as a push-type pin 23 can be provided in the channel near the bottom surface to ensure that the cable is within the channel after the module is installed. The pin can be removed during module installation or removal, allowing the stiff cable to flex freely into and out of the channel 14 as described below. Due to the radius of curvature of the channel, the cable will maintain its minimum bend radius while resting within the channel.

As shown in FIGS. 2 and 3, the cable sheathing beyond the cable clamp 22 is removed to expose the fiber ribbon 24. In this particular example, a strength member (not shown) is formed within the sheathing material. In cases where the strength member is separate from the sheathing, the member would also be removed beyond the cable clamp. It will also be noted, as is evident from FIG. 3, that the cable 21 is mounted in a vertical plane which is offset from the planes of the fiber connectors, e.g., 20 and 30, so that the cable can be positioned as close to the front panels 16 and 17 as possible without interfering with the connectors 20 and 30.

As shown in FIG. 2, the fiber ribbon 24 is bent downward to a fan-out member 25 at the bottom surface of the module where the individual fibers in the ribbon are separated. The excess fiber lengths are wound in a circle and held by fiber clamps 26 and 27. Each fiber is coupled at its end to an associated connector, e.g., 20 and 30, mounted in the front panels 16 and 17. The connectors shown in FIGS. 2 and 3 are the standard ST ® connectors, but any other type of optical fiber connector can be employed.

The module illustrated in FIGS. 1-3 would typically be installed at the factory on one end of a cable which may be wound on a reel or loosely wound. The module could then be installed either from the front or the back of a standard fiber optic distribution shelf.

Figure 4:
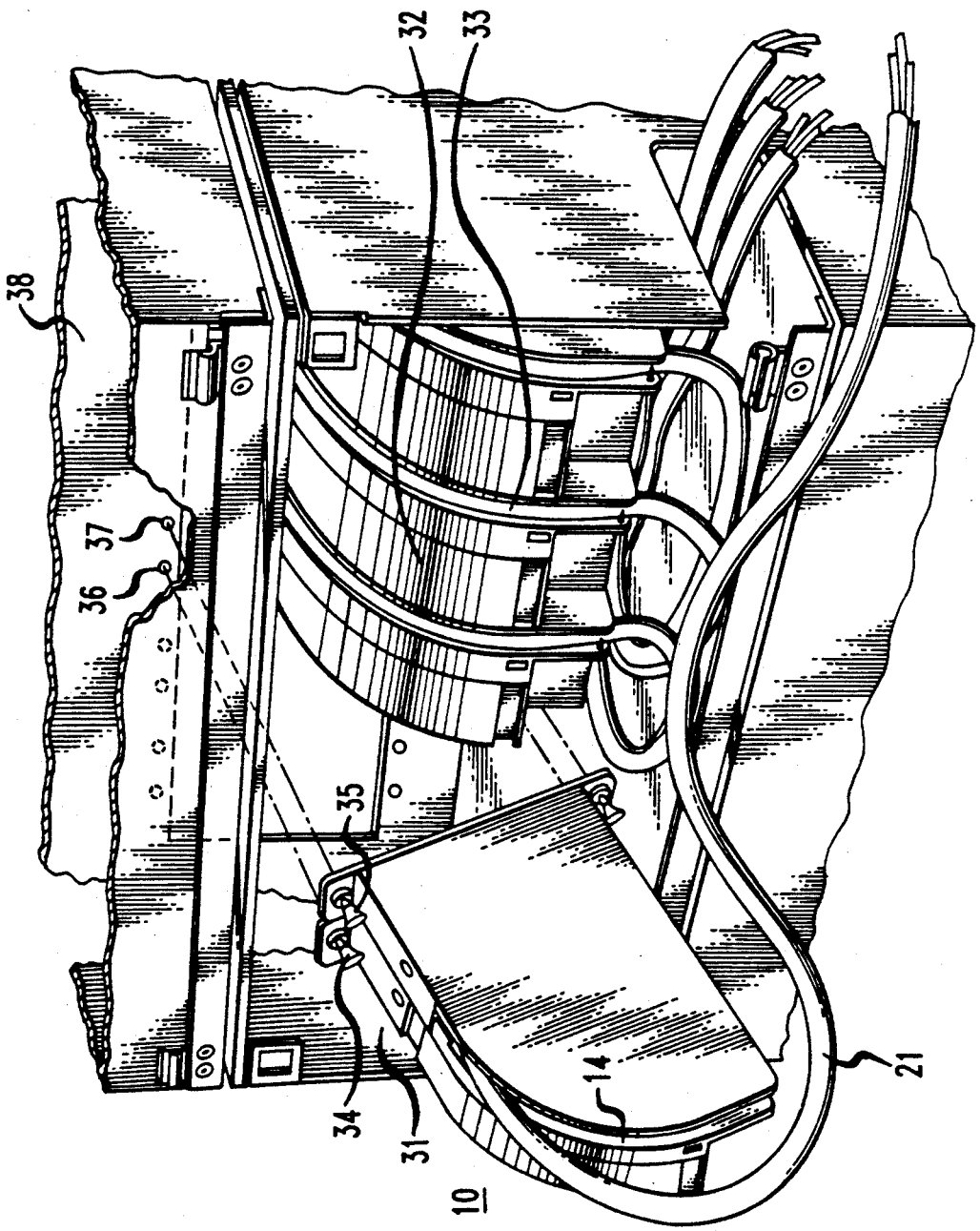
FIG. 4 is a perspective view of a distribution frame shelf including a plurality of modules such as shown in FIGS. 1-3 and demonstrating the installation of one of the modules.

FIG. 4 illustrates installation from the rear of a shelf. As shown, the shelf 31 already includes one or more other modules, e.g., 32, which have been installed previously. It will be noted that each cable, e.g., 33, lies within the channel of its associated module. The slack portion of each cable is positioned underneath the modules in a helical configuration. The remaining portion of each cable in this particular embodiment then exits the shelf at a side vent near the bottom of the shelf (not shown) and may run upward or downward along the supports of the distribution frame. The channels formed in each module ensure that their associated cables will maintain the minimum bending radius not only over the portion of contact between cable and module, but also in the slack portion underneath the modules in the shelf.

In order to install a module, e.g., 10, as shown, the craftsperson inserts a portion of cable 21 at some distance from the module into the area of the shelf beneath the other modules. The module 10 is then installed by inserting the push-type fasteners (e.g., 34 and 35 of FIG. 2) in the connector panels into the corresponding holes (e.g., 36 and 37) in the bulkhead (38) of the shelf to secure the module to the shelf. Since the cable 21 is free to flex out of the channel 14, the cable is free to form the slack in an appropriate helical configuration at the bottom of the shelf while the module is being installed. Once the module is secured to the shelf, the cable 21 is retained in the channel 14 by means of the push-type pin (23 of FIG. 2) near the bottom of the module.

When it is desired to remove the module, the cable 21 can, again, flex out of the channel by removing pin 23.

Thus, whether installing or removing the modules, the cable is never forced to exceed the minimum bend radius which will protect the fibers within the cable.

The invention is also advantageous when installing the modules from the front of the shelf. In such cases, the cable is positioned so that it is essentially parallel to the top surface 13 of the module as the cable is threaded through the shelf. The module is then secured to the bulkhead as before except from the front rather than the back surface and with the panels 16 and 17 mounted at the opposite surface of the bulkhead. Once the module is secured, the slack can be provided beneath the module at the bottom of the shelf and the cable positioned within the module's open channel as before.

Various modifications of the invention will become apparent to those skilled in the art. For example, splice trays, optical splitters, and other components could be provided within the housing as needed. The module could be mounted horizontally as well as vertically, depending upon the type of shelf employed. The cable secured to the module could include more than one fiber ribbon within the sheathing or may contain multiple separate fibers (usually, at least four fibers). The invention is most advantageous when the cable is stiff. This is usually the case where the diameter of the sheathing is within the range 0.15 to 0.36 inches.

All such variations which basically rely on the teachings through which the invention has advanced the art are properly considered within the scope of the invention.

I claim:

1. A device comprising:
   a housing including an interior and a curved outer surface;
   a channel formed within a portion of the curved surface, said channel being open along said curved surface and including a port communicating with the interior of the housing;
   an optical fiber cable secured to said housing so that the cable enters the interior at said port and a portion of the cable is positioned within the channel while the device is installed within a shelf and said portion is free to flex outside the channel during the device installation in and removal from the shelf; and
   an array of optical fiber connectors mounted at another surface of said housing.

2. The device according to claim 1 wherein the cable includes a sheathing which has a diameter in the range 0.15 to 0.36 inches.

3. The device according to claim 1 wherein the cable is secured to the housing by a clamp located near said port.

4. The device according to claim 1 further comprising a movable member at a portion of the channel remote from the port, which member retains the cable within the channel and is moved out of the channel during device installation and removal to permit flexing of the cable outside the channel.

5. The device according to claim 1 wherein the radius of curvature of the curved surface is at least 3 inches.

6. The device according to claim 2 wherein the cable includes at least one fiber and reinforcement member within the sheathing, and the sheathing and reinforcement member are removed within the interior of the housing to expose the fiber.

7. The device according to claim 1 wherein the channel is formed in a plane which is offset from the plane including the connectors.

* * * * *